(12) United States Patent
Murai et al.

(10) Patent No.: US 8,963,800 B2
(45) Date of Patent: Feb. 24, 2015

(54) MULTI-DISPLAY DEVICE AND IMAGE DISPLAY DEVICE

(75) Inventors: Takayuki Murai, Osaka (JP); Hideki Ichioka, Osaka (JP); Kohji Fujiwara, Osaka (JP); Naoko Kondoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 72 days.

(21) Appl. No.: 13/983,254

(22) PCT Filed: Feb. 3, 2012

(86) PCT No.: PCT/JP2012/052447
§ 371 (c)(1),
(2), (4) Date: Aug. 1, 2013

(87) PCT Pub. No.: WO2012/108337
PCT Pub. Date: Aug. 16, 2012

(65) Prior Publication Data
US 2013/0314458 A1     Nov. 28, 2013

(30) Foreign Application Priority Data
Feb. 10, 2011 (JP) ................................. 2011-027647

(51) Int. Cl.
  G09G 3/34        (2006.01)
  G06F 3/14        (2006.01)
  G02F 1/1335      (2006.01)
  G02F 1/1333      (2006.01)

(52) U.S. Cl.
  CPC ............ G09G 3/3406 (2013.01); G06F 3/1446 (2013.01); G02F 2001/133601 (2013.01); G09G 2300/026 (2013.01); G09G 2320/0233 (2013.01); G09G 2320/0626 (2013.01); G09G 2360/145 (2013.01); G09G 3/3426 (2013.01); G09G 2330/021 (2013.01); G09G 2360/16 (2013.01); G02F 1/13336 (2013.01)
  USPC .......................................... 345/1.1; 345/214

(58) Field of Classification Search
  CPC ................................... G09G 5/00; G06K 9/40
  See application file for complete search history.

(56) References Cited

U.S. PATENT DOCUMENTS

| 7,956,927 B2 * | 6/2011 | Kiuchi et al. ................. 348/441 |
| 8,724,897 B2 * | 5/2014 | Adachi ......................... 382/168 |
| 2004/0217918 A1 * | 11/2004 | Ando et al. .................... 345/1.1 |
| 2005/0111750 A1 * | 5/2005 | Shan et al. .................... 382/274 |
| 2010/0026722 A1 * | 2/2010 | Kondo ........................... 345/660 |
| 2011/0157262 A1 | 6/2011 | Fujiwara et al. |

FOREIGN PATENT DOCUMENTS

| JP | 2004-029332 A | 1/2004 |
| JP | 2004-226513 A | 8/2004 |
| JP | 4044930 B2 | 2/2008 |
| WO | 2010/041504 A1 | 4/2010 |

OTHER PUBLICATIONS

Official Communication issued in International Patent Application No. PCT/JP2012/052447, mailed on Mar. 6, 2012.

* cited by examiner

*Primary Examiner* — Andrew Sasinowski
(74) *Attorney, Agent, or Firm* — Keating and Bennett, LLP

(57) ABSTRACT

In order to display an image with a high contrast ratio while suppressing power consumed by a multi-display device and to adjust brightness of images displayed on image display devices, the multi-display device includes light emission APL value adjusting means 102. The light emission APL value adjusting means 102 sends, to light emission control means, a light emission APL value that has been adjusted, on the basis of light emission APL values calculated by light emission APL value calculating means of image display devices 11 to 19, so that total light emission power value of image-display light-emitting means 6 does not exceed an allowable power value and images are displayed at predetermined brightness.

13 Claims, 10 Drawing Sheets

| LIQUID CRYSTAL DISPLAY DEVICE | SUPPLIED POWER (W) | CORRECTION FACTOR |
|---|---|---|
| 11 | 60 | 1 |
| 12 | 100 | 25/30 |
| 13 | 60 | 1 |
| 14 | 100 | 25/30 |
| 15 | 100 | 25/60 |
| 16 | 100 | 25/30 |
| 17 | 60 | 1 |
| 18 | 100 | 25/30 |
| 19 | 60 | 1 |
| TOTAL | 740 | - |

| LIQUID CRYSTAL DISPLAY DEVICE | SUPPLIED POWER (W) | CORRECTION FACTOR |
|---|---|---|
| 11 | 25 | 25/60 |
| 12 | 50 | 25/60 |
| 13 | 25 | 25/60 |
| 14 | 50 | 25/60 |
| 15 | 100 | 25/60 |
| 16 | 50 | 25/60 |
| 17 | 25 | 25/60 |
| 18 | 50 | 25/60 |
| 19 | 25 | 25/60 |
| TOTAL | 400 | - |

(REFERENCE BACKLIGHT APL VALUE: 60%)

| LIQUID CRYSTAL DISPLAY DEVICE | SUPPLIED POWER (W) | CORRECTION FACTOR |
|---|---|---|
| 11 | 56 | 25/26.7 |
| 12 | 112 | 25/26.7 |
| 13 | 56 | 25/26.7 |
| 14 | 112 | 25/26.7 |
| 15 | 225 | 25/26.7 |
| 16 | 112 | 25/26.7 |
| 17 | 56 | 25/26.7 |
| 18 | 112 | 25/26.7 |
| 19 | 56 | 25/26.7 |
| TOTAL | 897 | - |

(REFERENCE BACKLIGHT APL VALUE: 26.7%)

| LIQUID CRYSTAL DISPLAY DEVICE | SUPPLIED POWER (W) | CORRECTION FACTOR |
|---|---|---|
| 11 | 38 | 25/40 |
| 12 | 75 | 25/40 |
| 13 | 38 | 25/40 |
| 14 | 75 | 25/40 |
| 15 | 150 | 25/40 |
| 16 | 75 | 25/40 |
| 17 | 38 | 25/40 |
| 18 | 75 | 25/40 |
| 19 | 38 | 25/40 |
| TOTAL | 602 | - |

(REFERENCE BACKLIGHT APL VALUE: 40%)

| SET | POWER SUBTOTAL (W) |
|---|---|
| UPPER | 151 |
| MIDDLE | 300 |
| LOWER | 151 |

MULTI-DISPLAY DEVICE AND IMAGE DISPLAY DEVICE

TECHNICAL FIELD

The present invention relates to a multi-display device in which multiple image display devices are sequentially arranged and to an image display device that constitutes a multi-display device.

BACKGROUND ART

Recently, multi-display devices have been proposed in which image display devices are arranged vertically, horizontally, or vertically and horizontally. In each of the image display devices, a light-transmittance adjustment device adjusts light transmittance for light emitted from an image-display light-emitting device, whereby an image is formed. Each of the image display devices forms an image corresponding to its arranged position, whereby the multi-display devices display a large-screen image.

In the multi-display devices, uneven brightness between images displayed by the individual image display devices worsens the continuity of the images, and consequently the viewer feels a sense of inconsistency. Accordingly, there are multi-display devices that adjust light emitted from image-display light-emitting devices included in corresponding image display devices so as to have the same brightness in all the image display devices (see, for example, Japanese Patent No. 4044930).

The image-display light-emitting device is a device that emits light of certain brightness. A transmittance adjustment device (for example, liquid crystal) included in the image display device adjusts light transmittance. In this way, an image is displayed. However, with the configuration of emitting light of certain brightness, such as the image-display light-emitting device, light emitted from the image-display light-emitting device needs to be blocked by the light-transmittance adjustment device when a black image is displayed. This often decreases the contrast ratio of the image.

Liquid crystal display devices are sometimes used as the image display devices. Liquid crystal display devices include a liquid crystal panel and a backlight serving as the image-display light-emitting device. In liquid crystal display devices, light transmittance for light emitted from the backlight is controlled by the liquid crystal panel, whereby an image is displayed. An example of such a backlight is a device including light-emitting elements provided in multiple divided areas of a plate-shaped member that is arranged to oppose the liquid crystal panel. There is a type (hereinafter, sometimes referred to as an "area-driven type") that controls light emission of the light-emitting elements provided in the individual areas on an area-by-area basis.

An area-driven type backlight is capable of adjusting brightness of the backlight (in other words, power supplied to the light-emitting elements of the backlight) on an area-by-area basis in accordance with image data. That is, the area-driven type backlight is capable of performing adjustment to make light-emitting elements belonging to an area brighter as an image of the corresponding portion is brighter and make the rest of the light-emitting elements darker. Consequently, an image with a high contrast ratio can be obtained. As the light-emitting elements of the backlight, elements that emit light (that change light emission brightness) in accordance with supplied current (power), notably LEDs, are used in most cases.

Also, in the liquid crystal display devices, a certain limit power value is set for power consumption of the backlight because of demands for reduced power consumption, reduced heat generation, and so forth. Some liquid crystal display devices control driving of the backlight so that the light emission power value of the backlight does not exceed the limit power value.

Liquid crystal display devices including such an area-driven-type backlight can obtain an image with a high contrast ratio (with peak brightness) while suppressing power consumption thereof. By constituting a multi-display device by sequentially arranging such liquid crystal display devices, a large-screen image with a high contrast ratio (with peak brightness) can be displayed while suppressing the power consumption.

CITATION LIST

Patent Literature

PTL 1: Japanese Patent No. 4044930

SUMMARY OF INVENTION

Technical Problem

However, in multi-display devices using conventional liquid crystal display devices, each of the liquid crystal display devices limits power supplied to the backlight in accordance with an image to be displayed so that power consumed by the backlight does not exceed the limit power value. Thus, at a portion where brightness of an image is high, a decrease in brightness due to limitation of power is large; at a portion where brightness of an image is low, a decrease in brightness is small. If decreases in image brightness differ from one another among the liquid crystal display devices, brightness varies among the liquid crystal display devices when the images are viewed on the multi-display device, and consequently continuity of the images may be lost and the display quality may be decreased.

Although the above description uses the case where the image-display light-emitting device is a backlight by way of example, similar issues may occur in various devices that can perform area driving and that perform control to limit the total light emission power of the image-display light-emitting device in accordance with an image to be displayed.

Accordingly, the present invention aims to provide a multi-display device in which multiple image display devices are sequentially arranged and which is capable of displaying an image with a high contrast ratio while suppressing power and of adjusting brightness of the image. The present invention also aims to provide an image display device that constitutes such a multi-display device.

Solution to Problem

To this end, according to the present invention, a multi-display device, in which a plurality of image display devices are sequentially arranged and which is operable to display a continuous image, includes, in the image display devices, image-display light-emitting means including light-emitting elements that emit light for displaying the image; light emission brightness data determining means for determining, on the basis of image data displayed by the corresponding image display device, light emission brightness data for the image-display light-emitting means; light emission APL value calculating means for calculating, on the basis of the light emission brightness data, a light emission APL value which is an average lighting ratio of the light-emitting elements; light emission APL value adjusting means for adjusting, on the basis of the light emission APL values calculated by the light emission APL value calculating means each included in a corresponding one of the plurality of image display devices, a reference light emission APL value so that a total light emission power value of the image-display light-emitting means does not exceed a predetermined allowable power value and images are displayed on the plurality of image display devices at predetermined brightness; and light emission control means for controlling power to be supplied to the image-display light-emitting means, on the basis of the light emission APL value calculated by the light emission APL value calculating means or the reference light emission APL value adjusted by the light emission APL value adjusting means.

According to this configuration, inconsistency of an image displayed on the multi-display device due to brightness unevenness, brightness difference, or the like is less likely to occur when brightness of backlights of the image display devices included in the multi-display device is controlled. Also, by performing control of brightness of backlights, the total light emission power (power consumption) may be suppressed.

In the above configuration, the light emission APL value adjusting means may send, as the reference light emission APL value, a light emission APL value that has been adjusted so as to equalize brightness of images displayed on all the image display devices, to the light emission control means. According to this configuration, brightness difference is less likely to occur in images displayed on the image display devices. Thus, the viewer is less likely to feel a sense of inconsistency for the image displayed on the multi-display device.

In the above configuration, the light emission APL value adjusting means may be provided outside the plurality of image display devices, may receive light emission APL values from the light emission APL value calculating means of the individual image display devices, and may send, as the reference light emission APL value, an adjusted light emission APL value to the light emission control means. In this configuration, the light emission APL value adjusting means may be included in an image division device that forms images corresponding to the plurality of image display devices and that sends pieces of image data of the images to the corresponding image display devices.

In the above configuration, the light emission APL value adjusting means may be included in at least one of the plurality of image display devices. The light emission APL value adjusting means may receive light emission APL values calculated by the light emission APL calculating means included in the individual image display devices, and may send, as the reference light emission APL value, a light emission APL value that has been adjusted if needed to the light emission control means of the individual image display devices.

In the above configuration, the light emission APL value adjusting means may be included in all the plurality of image display devices, may receive the light emission APL value calculated by the light emission APL value calculating means included in the same image display device. The light emission APL value adjusting means may set the light emission APL value that has been adjusted if needed as the reference light emission APL value, and may send and receive the reference light emission APL values to and from the light emission APL value adjusting means included in the other image display devices.

According to the above configuration, a device including the light emission APL value adjusting means need not be provided separately from the image display devices. The image display devices may be easily moved or installed.

In the above configuration, the light emission APL value adjusting means may adjust the light emission APL value if needed, and may send, as the reference light emission APL value, the adjusted light emission APL value to the light emission control means. With this configuration, operation of the light emission APL value adjusting means may be reduced when adjustment of the light emission APL value is not necessary, and power consumption may be reduced accordingly.

In the above configuration, the light emission APL value adjusting means may store, as a limit value, a ratio of power to be supplied to the image-display light-emitting means when white display is performed in each of the image display devices to maximum power that can be supplied. The light emission APL value adjusting means may determine that the light emission APL value is to be adjusted in a case where at least one of the light emission APL values sent from the plurality of image-display light-emitting means exceeds the limit value of the corresponding image-display light-emitting means, and may send, as the reference light emission APL value, the greatest light emission APL value among the plurality of light emission APL values to the light emission control means.

In the above configuration, the light emission APL value adjusting means may store, as a limit value, a ratio of power to be supplied to all the image-display light-emitting means when white display is performed in all the image display devices to maximum power that can be supplied. The light emission APL value adjusting means may determine that the light emission APL value is to be adjusted in a case where the sum of the light emission APL values sent from the plurality of light emission APL value calculating means exceeds the sum of the limit values of the image-display light-emitting means, and may send, as the reference light emission APL value, an average of the plurality of light emission APL values to the light emission control means.

In the above configuration, the light emission APL value adjusting means may manage the plurality of image display devices as a plurality of groups, and may store, as a limit value, a ratio of power to be supplied to the image-display light-emitting means when white display is performed in each of the image display devices to maximum power that can be supplied. The light emission APL value adjusting means may determine that the light emission APL value is to be adjusted in a case where at least one of the light emission APL values sent from the plurality of image-display light-emitting means exceeds the limit value of the corresponding image-display light-emitting means, may calculate averages of the light emission APL values for the individual groups, and may send, as the reference light emission APL value, the greatest value among results of the calculation to the light emission control means.

In the above configuration, the light emission brightness data may be data representing a value of current to be supplied to the light-emitting elements. The light emission control means may include light emission brightness data correcting means for multiplying the light emission brightness data by a correction factor which is a ratio of the limit value to the received reference light emission APL value.

In the above configuration, light emission brightness of the light-emitting elements may be controlled using PWM control. The light emission control means may calculate a duty ratio of a PWM signal, on the basis of at least the light emission brightness data that has been corrected by the light emission brightness data correcting means.

In the above configuration, the image-display light-emitting means may be divided into a plurality of areas. The light emission APL value calculating means may calculate the light emission APL value by dividing the sum of lighting ratios of the light-emitting elements in the individual areas by the number of areas.

In the above configuration, the image display devices may be liquid crystal display devices and the image-display light-emitting means may be a backlight. Also, the light-emitting means may be an LED.

In the above configuration, the image display device may be operable to display an image independently.

Advantageous Effects of Invention

According to the present invention, a multi-display device may be provided in which multiple image display devices are sequentially arranged and which is capable of displaying an image with a high contrast ratio while suppressing power and of adjusting brightness of the image. Also, an image display device that constitutes such a multi-display device may be provided.

DESCRIPTION OF EMBODIMENTS

Embodiments of the present invention will be described below with reference to the drawings.
(Regarding Configuration of Multi-display Device)

Figure 1:
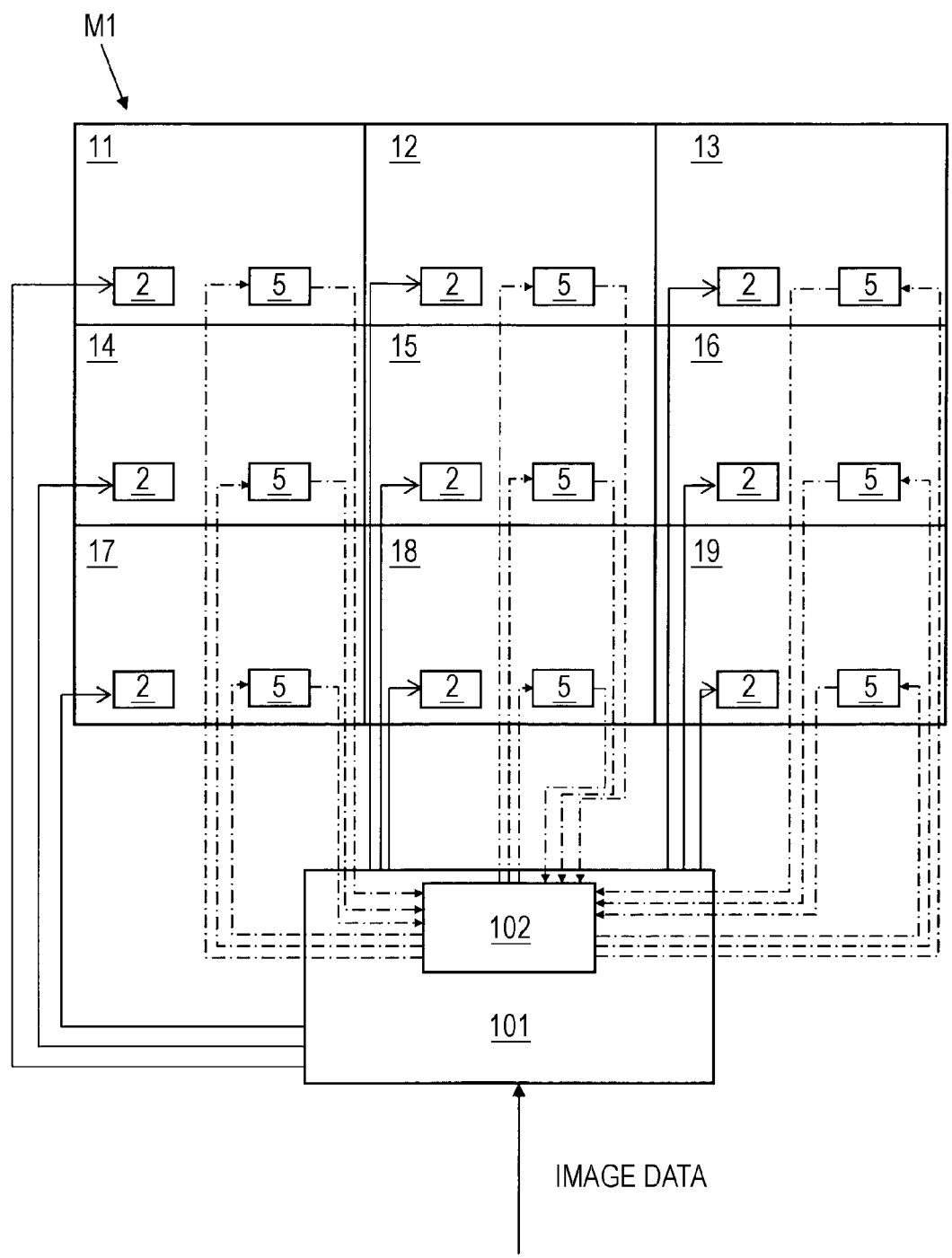
FIG. 1 is a diagram illustrating the overall configuration of a multi-display device according to the present invention.

FIG. 1 is a diagram illustrating the overall configuration of a multi-display device according to the present invention. As illustrated in FIG. 1, a multi-display device M1 includes nine liquid crystal display devices 11 to 19, an image distribution device 101, and a light emission APL value adjustment unit 102 (light emission APL value adjusting means). The light emission APL value adjustment unit 102 manages backlight APL values (light emission APL values), which are average lighting ratios of backlight units 6, described later, included in the liquid crystal display devices 11 to 19.

The image distribution device 101 is connected to each of the nine liquid crystal display devices 11 to 19. The image distribution device 101 divides image data of an image of one screen sent from an optical disc device, such as a DVD device or BD device, or a personal computer into nine images to be displayed on the nine liquid crystal display devices 11 to 19. After performing processing on pieces of image data for corresponding screens if needed, the image distribution device 101 outputs the pieces of image data to the corresponding liquid crystal display devices 11 to 19. Image data of one screen may be sent to each of the liquid crystal display devices 11 to 19 without being divided. Furthermore, each of nine different images may be sent to a corresponding one of the liquid crystal display devices 11 to 19. The image distribution device 101 is well known in the related art, and thus a detailed description thereof is omitted. Note that solid-line arrows that extend from the image distribution device 101 to the liquid crystal display devices 11 to 19 in FIG. 1 represent image data flows.

As illustrated in FIG. 1, the liquid crystal display devices 11 to 19 are arranged in such a manner that three devices are on each row and on each column to make image display surfaces thereof be located on the same plane, thereby forming one screen. The liquid crystal display devices 11 to 19 have the same size and the same configuration. The screen formed by the arranged liquid crystal display devices 11 to 19 has the same aspect ratio as a single liquid crystal display device (for example, the liquid crystal display device 11) and is nine times (substantially nine times) larger than that of the single liquid crystal display device. Reference numerals 2 and 5 inside each of the liquid crystal display devices 11 to 19 respectively represent an image data acquisition unit 2 and an LED controller 5, which will be described later.

The light emission APL value adjustment unit 102 is a control unit for adjusting light emission power (backlight light emission power) of each backlight of a corresponding one of the liquid crystal display devices 11 to 19. The light emission APL value adjustment unit 102 is provided inside the image distribution device 101 but may be provided as a separate independent device. Note that one-dot chain-line arrows extending from the light emission APL value adjustment unit 102 each represent a diagram indicating a flow of a reference backlight APL value (a reference light emission APL value). Details about the reference backlight APL value will be described later.
(Regarding Configuration of Liquid Crystal Display Device)

Next, details about the liquid crystal display devices 11 to 19 that constitute the multi-display device M1 will be described with reference to the drawing. Note that the configuration of the liquid crystal display device 11 will be described as a representative herein because the liquid crystal display devices 11 to 19 have the same configuration.

Figure 2:
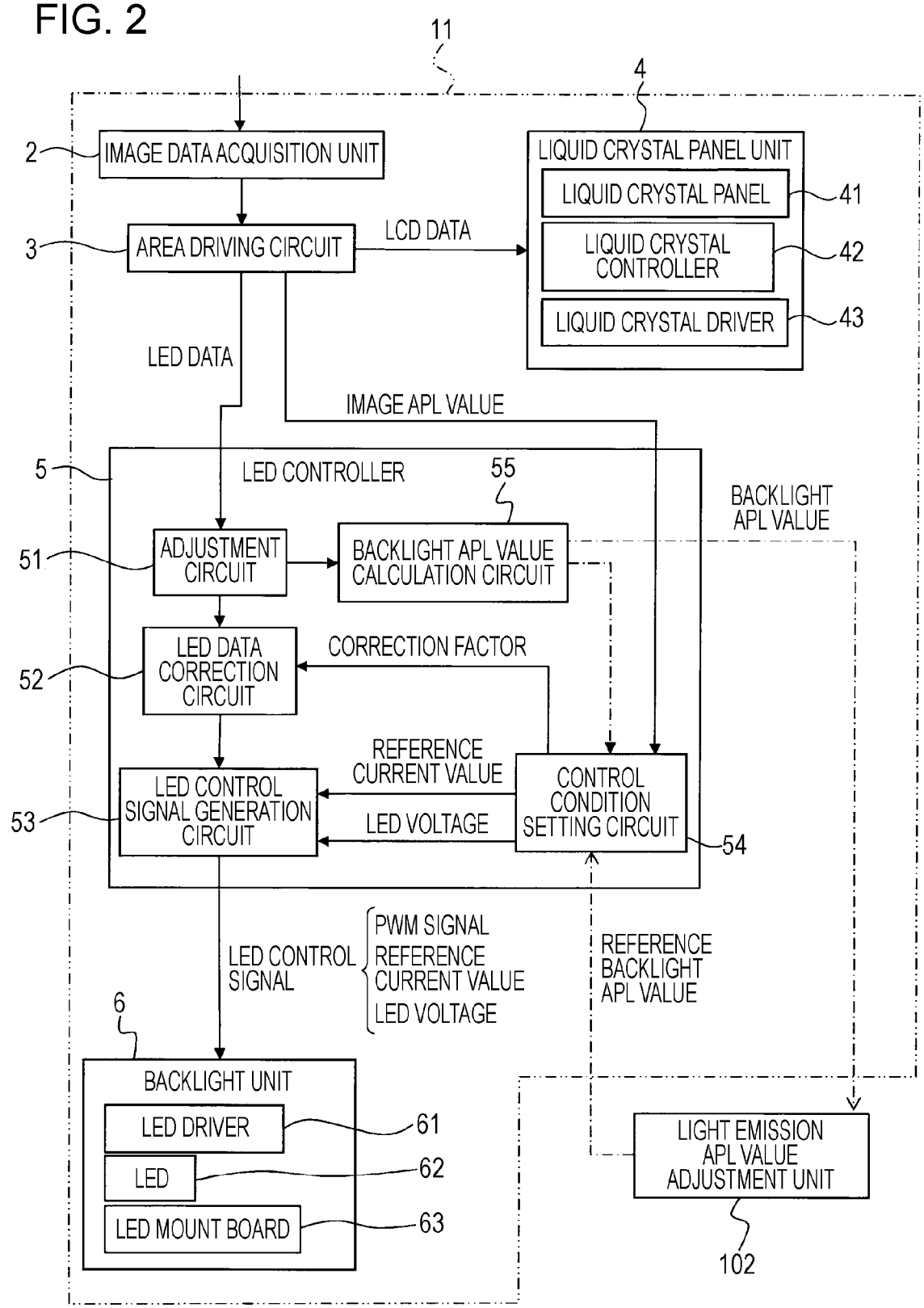
FIG. 2 is a diagram illustrating the configuration of a liquid crystal display device which is an example of an image display device according to the present invention.

FIG. 2 is a diagram illustrating the configuration of the liquid crystal display device, which is an example of an image display device according to the present invention. As illustrated in FIG. 2, the liquid crystal display device 11 includes the image data acquisition unit 2, an area driving circuit 3 (light emission brightness data determining means), a liquid crystal panel unit 4, the LED controller 5 (light emission control means and light emission APL value calculating means), and the backlight unit 6 (image-display light-emitting means). Note that a portion surrounded by a two-dot chain line in FIG. 2 represents the liquid crystal display device 11. That is, the light emission APL value adjustment unit 102 (light emission APL value adjusting means) is provided outside the liquid crystal display device 11 and is included in the image distribution device 101 herein.

The image data acquisition unit 2 includes an external input interface for acquiring image data sent from the image distribution device 101. The image data acquisition unit 2 sends the acquired image data (video signal) to the area driving circuit 3. Note that image data is data that identifies, for each frame, brightness of individual pixels or the like, that is, the content of a moving image (or still image).

The area driving circuit 3 receives image data from the image data acquisition unit 2, and generates data (light emission brightness data) representing light emission brightness of each LED 62 (described later) of the backlight unit 6 in accordance with this image data. Note that brightness of each LED 62 is determined depending on current supplied thereto (supplied current). The light emission brightness of each LED 62 is substantially proportional to the supplied current. Accordingly, the area driving circuit 3 generates, as light emission brightness data, data (hereinafter, referred to as LED data) representing the magnitude of current to be supplied to each LED 62 of the backlight unit 6. The LED data (light emission brightness data) is generated so that the LED data represents larger current (the light emission brightness of the LED becomes higher) as brightness of image data becomes higher. The LED data, for which, for example, a 12-bit digital signal format is employed, is sent to the LED controller 5.

Also, the supplied current to each LED 62 is controlled using PWM (Pulse Width Modulation) control. The supplied current is determined depending on a product of a value (reference current value) of reference current (current that flows through each LED in response to ON of PWM control) and a duty ratio of PWM control (hereinafter, also referred to as a PWM value).

Also, based on the image data, the area driving circuit 3 generates data (hereinafter, referred to as image APL data) representing an APL (Average Picture Level) of an image of each frame, and sends the image APL data to the LED controller 5. Further, based on the image data, the area driving circuit 3 generates LCD data, which is data of light transmittance of each pixel of the liquid crystal panel 41 described later, and sends the LCD data to the liquid crystal panel unit 4.

The liquid crystal panel unit 4 is a unit that functions as a panel for displaying an image, and includes the liquid crystal panel 41, a liquid crystal controller 42, and a liquid crystal driver 43. The liquid crystal panel 41 has a rectangular shape in plan view, and is constructed in such a manner that liquid crystal is sealed between a pair of glass substrates that are bonded together with a certain gap interposed therebetween.

One of the glass substrates has thereon switching elements (for example, thin-film transistors) connected to source lines and gate lines which are perpendicular to each other, pixel electrodes connected to the switching elements, and an alignment film, and so forth. The other glass substrate has thereon a color filter in which colored portions of red, green, and blue (RGB) are arranged in a predetermined pattern, common electrodes, an alignment film, and so forth.

Polarizing palates are provided on the respective outer sides of the glass substrates. Note that 1920×1080 color pixels (pixels of RGB colors) for HD display are formed in a display area of the liquid crystal panel 41 of the liquid crystal panel unit 4. Note that the number of pixels and the number of colors are not limited to this example and may be configured in another way. The display area of the liquid crystal panel 41 is equally divided into multiple areas.

Based on the LCD data sent from the area driving circuit 3, the liquid crystal controller 42 generates a signal for driving the liquid crystal driver 43, and sends the signal to the liquid crystal driver 43. Based on the signal received from the liquid crystal controller 42, the liquid crystal driver 43 switches the state of the switching elements of the pixels of the liquid crystal panel.

In this way, in accordance with the image data, voltages applied to pixel electrodes of the liquid crystal panel 41 are adjusted, liquid crystal arranged in the individual pixels is driven, and light transmittances of the individual pixels are adjusted. In the liquid crystal display device 11, light is incident on the back surface of the liquid crystal panel unit 4 from the backlight unit 6, whereby an image can be displayed on the display area of the liquid crystal panel 41.

The LED controller 5 includes an adjustment circuit 51, an LED data correction circuit 52 (light emission brightness data correcting means), an LED control signal generation circuit 53, a control condition setting circuit 54, and a backlight APL value calculation circuit 55. The supplied current to each LED 62 of the backlight unit 6 is controlled using PWM control, details about which will be described later.

The adjustment circuit 51 performs adjustment, such as white balance and temperature correction, on the LED data sent from the area driving circuit 3. The adjusted LED data is sent to the backlight APL value calculation circuit 55 and the LED data correction circuit 52.

In the LED data correction circuit 52, information of a correction factor used to correct LED data is set (recorded) in an updatable (rewritable) manner. Based on the LED data and the correction factor, the LED data correction circuit 52 calculates a corrected value of the LED data. The LED data corrected in this manner is sent to the LED control signal generation circuit 53. Note that the correction factor is used for all areas in common.

In the LED control signal generation circuit 53, information of a reference current value and an LED voltage value (a value of voltage necessary for causing each LED 62 to appropriately emit light) is set (recorded) in an updatable (rewritable) manner. In accordance with the LED data sent from the LED data correction circuit 52, the LED control signal generation circuit 53 generates a PWM signal for each area. The LED control signal generation circuit 53 then generates an LED control signal, which contains the PWM signals for the individual areas and information of the currently set reference current value and the currently set LED voltage value, and sends the LED control signal to the backlight unit 6.

The control condition setting circuit 54 receives the backlight APL value sent from the backlight APL value calculation circuit 55 or the adjusted backlight APL value (also referred to as a reference backlight APL value because this backlight APL value serves as a reference value for determining the control condition) sent from the light emission APL value adjustment unit 102. Note that the backlight APL value (%), which will be described in detail later, is a value obtained by dividing the sum of lighting ratios of LEDs in the individual areas of the backlight unit 6 by the number of areas, that is, the average lighting ratio of the LEDs 62 of the backlight unit 6.

The control condition setting circuit 54 receives the backlight APL value from the backlight APL value calculation circuit 55 when the liquid crystal display device 11 is used solely, and receives the adjusted reference backlight APL value from the light emission APL value adjustment unit 102 when the liquid crystal display device 11 is used as a part of the multi-display device M1. Note that even when the liquid crystal display device 11 is used as a part of the multi-display device M1, the control condition setting circuit 54 may receive the backlight APL value from the backlight APL value calculation circuit 55. The control condition setting circuit 54 calculates a correction factor from the backlight APL value or the adjusted backlight APL value.

The control condition setting circuit 54 also receives the image APL data from the area driving circuit 3. Based on the image APL data, the control condition setting circuit 54 appropriately updates values (the reference current value, the correction factor, and the LED voltage value) regarding control conditions set in the circuits (52 to 53). An operation of the LED controller 5 will be described in detail later.

Based on the LED data that has been adjusted by the adjustment circuit 51 of the LED controller 5, the backlight APL value calculation circuit 55 calculates a backlight APL value (%), and sends the backlight APL value to the light emission APL value adjustment unit 102 and (or) the control condition setting circuit 54.

Now, the backlight APL value will be described in detail. The backlight APL value is a value obtained by dividing the sum of lighting ratios of LEDs in the individual areas of the backlight unit 6 by the number of areas. Brightness of each LED 62 is determined depending on the LED data. Brightness of each LED 62 is proportional to the magnitude of the supplied current. Accordingly, the backlight APL value is determined on the basis of the LED data, for example, in the following manner. The backlight APL value is calculated using an expression represented by (the sum of pieces of LED data corresponding to the areas)/{(the maximum value that the LED data for each area can take)×(the number of areas)}.

Although the backlight APL value calculation circuit 55 calculates the backlight APL value on the basis of the LED data that has been adjusted by the adjustment circuit 51, the backlight APL value may be calculated on the basis of the LED data sent from the area driving circuit 3. Furthermore, although the backlight APL value calculation circuit is incorporated into the LED controller in the liquid crystal display device 11, the backlight APL value calculation circuit may be provided separately from the LED controller.

The backlight unit 6 includes an LED driver 61, the LEDs 62, an LED mount board (LED panel) 63, so-called optical members (not illustrated), such as diffuser plates and optical sheets, necessary for forming a backlight. The backlight unit 6 functions as a backlight of the liquid crystal display device. The LED driver 61 has one or multiple control channels to which LEDs 62 are connected. Also, in accordance with the LED control signal supplied from the LED controller 5, the LED driver 61 drives the LEDs 62 connected to the control channel.

Specifically, during a period over which the PWM signal is the high level (ON), the LED driver 61 supplies current of the reference current value to the LEDs 62 in the area corresponding to the PWM signal so as to turn on the LEDs 62. At this time, the LED driver 61 causes the LED voltage value to be applied to the LEDs 62. On the other hand, during a period over which the PWM signal is the low level (OFF), the LED driver 61 stops supplying current to the LEDs 62 in the area corresponding to the PWM signal so as to turn off the LEDs 62. Note that connecting the LEDs 62 to different control channels at least in units of areas makes it possible to control ON/OFF of the LEDs 62 in units of areas.

Generally, for each LED 62, the larger the reference current value, the larger the LED voltage value; the smaller the reference current value, the smaller the LED voltage value (the LED 62 is controlled in this way in accordance with the LED control signal). When increasing the reference current from the current level, the LED driver 61 increases the voltage applied to the LED first and then increases the reference current. Conversely, when decreasing the reference current from the current level, the LED driver 61 decreases the reference current first and then decreases the voltage applied to the LED.

Also, the LEDs 62, which are for example chip LEDs, are mounted on a mount surface of the LED mount board 63 and function as a backlight light source for the liquid crystal panel unit 4. Also, the LED mount board 63 is arranged behind the liquid crystal panel unit 4 so that the mount surface of the LED mount board 63 faces the liquid crystal panel unit 4.

The LED mount board 63 is divided into as many areas as the number of areas of the liquid crystal panel 41. The areas of the LED mount board 63 and the areas of the liquid crystal panel 41 have one-to-one correspondence.

The LEDs 62 form LED units, in each of which LEDs for emitting light of wavelengths of red, green, and blue (R, G, B) are collected. At least one LED unit is arranged in each area of the LED mount board 63. Note that the LED unit emits light of every wavelength to form white light as a whole. Also, the LEDs 62 may have another configuration (the type, color, and combination). For example, instead of the above-described LED unit, a white LED such as a pseudo-white LED or high color rendering white LED may be used. Alternatively, an LED unit in which an LED for emitting light of wavelength of yellow (Y) and the above-described RGB LEDs are collected may be used.

The liquid crystal display device 11, which has the configuration described above, generates LCD data and LED data on the basis of image data acquired by the image data acquisition unit 2, controls the light transmittance of the liquid crystal panel 41 and the brightness of the LEDs 62 (backlight) so as to display an image. The liquid crystal display devices 11 to 19 display corresponding images, whereby the multi-display device M1 displays a large-screen image.

In the liquid crystal display devices, a certain limit power value is set for backlight light emission power (power to cause the LEDs 62 to emit light) because of demands for reduced power consumption, reduced heat generation, and so forth. Accordingly, the LED controller 5 controls light emission of the backlight unit 6 so that the backlight light emission power value does not exceed the limit power value.

Next, control of backlight light emission power supplied to the backlight unit 6 will be described. First, control of backlight light emission power in the liquid crystal display device alone will be described. Then, control of backlight light emission power of each of the nine liquid crystal display devices 11 to 19 in the whole multi-display device M1 will be described.

(Regarding Control of Backlight Light Emission Power of Liquid Crystal Display Device)

Figure 3:
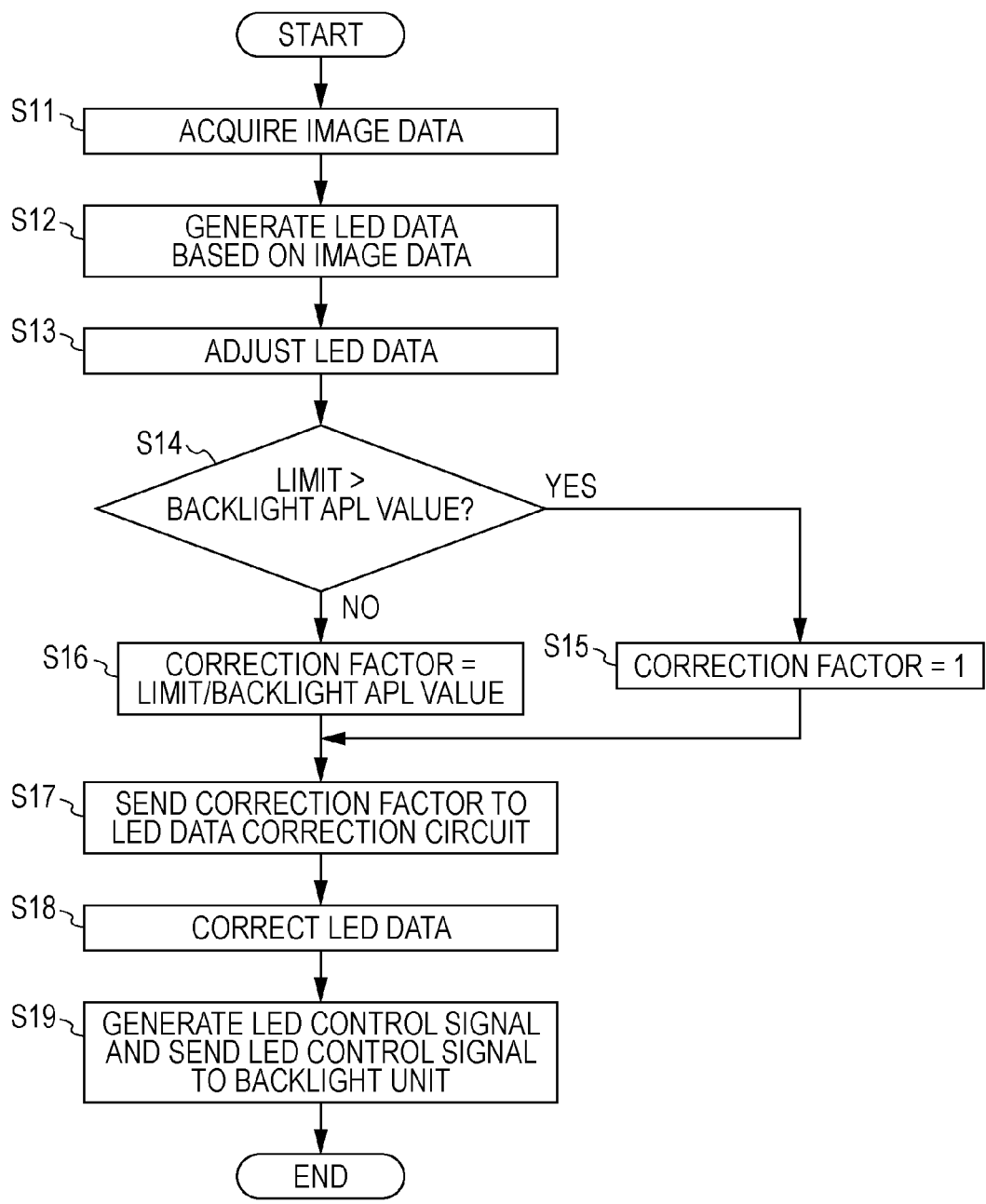
FIG. 3 is a flowchart illustrating an example of a procedure of controlling backlight light emission power in the liquid crystal display device illustrated in FIG. 2.

First, a procedure of controlling backlight light emission power in the case where the liquid crystal display device is used solely will be described with reference to the drawing. FIG. 3 is a flowchart illustrating an example of the procedure of controlling light emission power supplied to the backlight in the liquid crystal display device illustrated in FIG. 2. Note that when the liquid crystal display device 11 is used solely, the backlight APL value calculation unit 55 sends the backlight APL value to the control condition setting circuit 54 instead of the light emission APL value adjustment unit 102 which is provided outside the liquid crystal display device 11.

Power (backlight light emission power) to be supplied to the backlight unit 6 is calculated by (supplied current)×(supplied voltage). Because the supplied voltage is a fixed value, the backlight light emission power is determined depending on the supplied current. Also, the supplied current is calculated on the basis of the LED data. Accordingly, the supplied power to the backlight can be corrected (limited) by correcting (limiting) the value of the LED data and generating the LED control signal on the basis of the value as described above. Using the above, the LED controller 5 performs backlight light emission power control.

First, the image data acquisition unit 2 acquires image data from an external device (step S11). This image data may be data received as TV broadcast or the like, or data sent from an external video device, such as a DVD device or a BD device. The image data acquisition unit 2 sends the acquired image data to the area driving circuit 3. Upon receipt of the image data, the area driving circuit 3 generates LED data for each area on the basis of this image data (step S12). Each LED data represents the total amount of current supplied to the LEDs 62 in the corresponding area.

Note that each LED data is determined on the basis of brightness of image data for a corresponding area. However, there are multiple pixels in the liquid crystal panel 41 corresponding to the area. Accordingly, based on the maximum value of brightness of the multiple pixels, LED data of each area is determined. Note that the method for determining the LED data is not limited to this one. For example, the LED data may be determined on the basis of an average brightness of multiple pixels of a corresponding area.

In the case where the acquired image data is data of a moving image, the LED data for each area is determined in synchronization with a frame cycle (that is, for each frame). Determination of the LED data is not limited to determination for each frame and may be performed for every a certain number of frames, for example, for every five frames or every ten frames. In the case where the acquired image data is a still image, the LED data may be determined when the image is changed.

This LED data is sent to the LED controller 5. In the LED controller 5 to which the LED data has been sent, the adjustment circuit 51 performs adjustment, such as white balance and temperature correction, on the LED data supplied from the area driving circuit 3 (step S13). The adjusted LED data is sent to the backlight APL value calculation circuit 55 and also to the LED data correction circuit 52. Based on the LED data received from the adjustment circuit 51, the backlight APL value calculation circuit 55 calculates a backlight APL value and sends the backlight APL value to the control condition setting circuit 54 of the LED controller 5.

The control condition setting circuit 54 that has received the backlight APL value compares the backlight APL value with the limit value (%) for the backlight unit 6 (step S14). The limit value will be described here. The limit value is a ratio of the limit power value to the maximum value of power that can be supplied to the backlight unit 6. Generally, the supplied power to the backlight unit 6 is the maximum when the liquid crystal panel unit 4 is driven to perform full white display, and the value thereof is limited to a predetermined limit power value in order to achieve reduced power consumption and low heat generation. Note that each device is given a fixed limit value.

On the other hand, the backlight APL value is a value (%) calculated using an expression represented by (the sum of pieces of LED data corresponding to the areas)/{(the maximum value that the LED data for each area can take)×(the number of areas)}. It is possible to determine whether the driving power value (light emission power value) of the backlight unit 6 exceeds the limit power value by comparing the limit value with the backlight APL value.

If the control condition setting circuit 54 determines that the limit value is greater than the backlight APL value (YES in step S14), the control condition setting circuit 54 sets the correction factor to 1 (step S15), and sends the correction factor to the LED data correction circuit 52 (step S17). In contrast, if the control condition setting circuit 54 determines that the limit value is less than the backlight APL value (NO in step S14), the control condition setting circuit 54 calculates, as the correction factor, a value by dividing the limit value by the backlight APL value (step S16), and sends the correction factor to the LED data correction circuit 52 (step S17). Note that the control condition setting circuit 54 may send an instruction to omit correction to the LED data correction circuit 52 instead of sending the correction factor of 1 when determining that the limit value is greater than the backlight APL value.

The LED data correction circuit 52 that has received the correction factor from the control condition setting circuit 54 in step S17 multiples the LED data received from the adjustment circuit 51 by the correction factor (step S18). Thereafter, the corrected LED data is sent to the LED control signal generation circuit 53.

Based on the LED data for each area received from the LED data correction circuit 52, the LED control signal generation circuit 53 generates a PWM signal for the corresponding area. The LED control signal generation circuit 53 generates an LED control signal, which contains the PWM signals and pieces of information of the currently set reference current value and the currently set LED voltage value, and sends the LED control signal to the backlight unit 6 (step S19). The backlight light emission power is controlled through the above procedure.

As described above, control can be performed so that power supplied to the backlight unit 6 does not exceed the limited power by controlling the backlight light emission power. Also, the ratio of the pieces of corrected LED data for individual areas is the same as the state before the correction is made. Therefore, a displayed image with a high contrast ratio (with peak brightness) may be maintained as much as possible. That is, an image with peak brightness can be displayed with the light emission power value of the backlight unit 6 suppressed to the limited power value or lower by performing the above-described backlight light emission power control.

Next, control of backlight light emission power of the multi-display device in which the nine liquid crystal display devices 11 to 19 are sequentially arranged will be described with reference to the drawing. First, the case where the above-described backlight light emission power control (brightness control) is performed individually for the nine liquid crystal display devices 11 to 19 will be described. Thereafter, the case where backlight light emission power control (brightness control) is performed using the light emission APL value adjustment unit 102 will be described.

Figure 4:
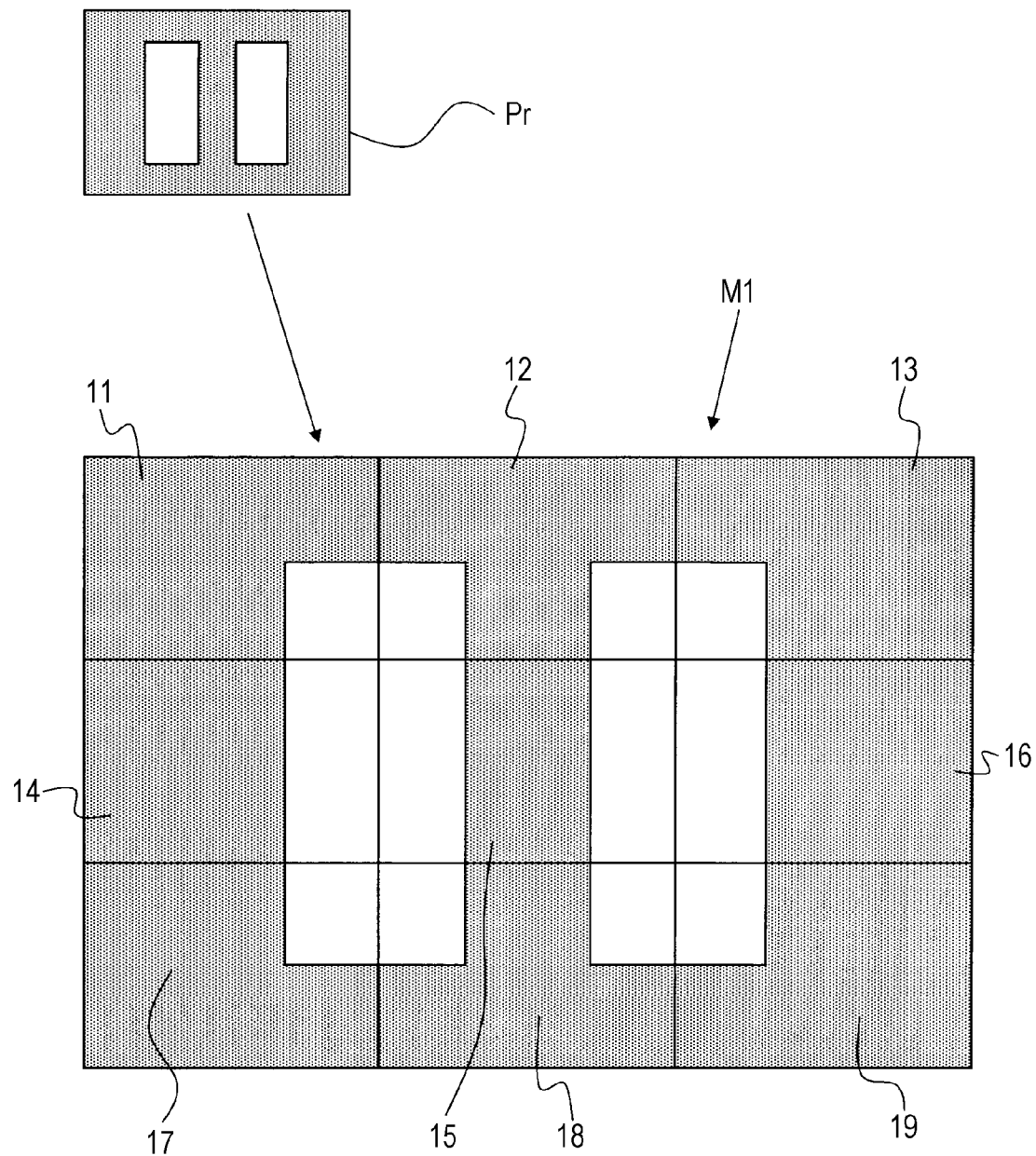
FIG. 4 is an example of an image displayed on the multi-display device.
Figure 5:
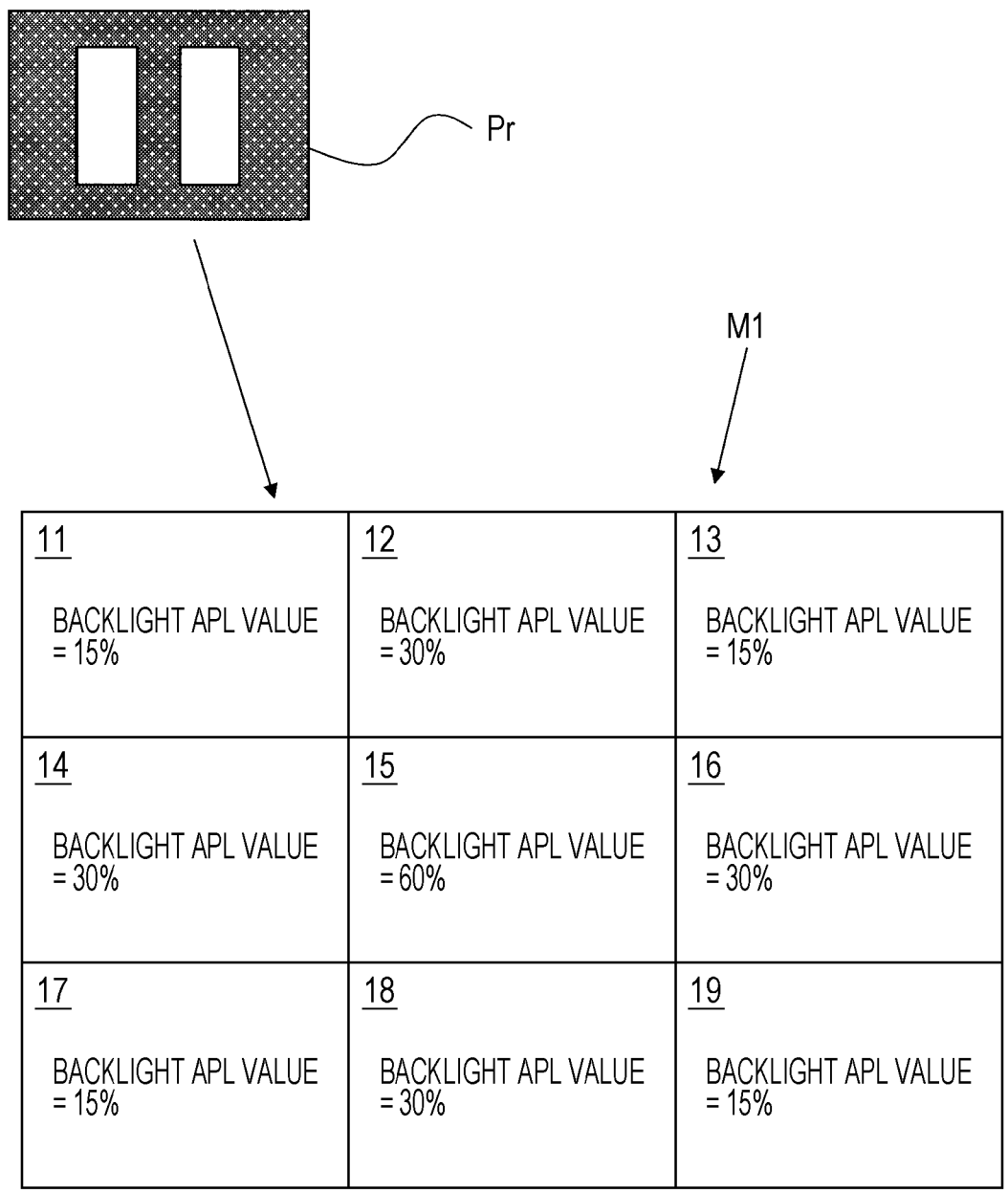
FIG. 5 is a diagram illustrating backlight APL values for the liquid crystal display devices when the image illustrated in FIG. 4 is displayed.

FIG. 4 is an example of an image displayed on the multi-display device. FIG. 5 is a diagram illustrating backlight APL values for the corresponding liquid crystal display devices when the image illustrated in FIG. 4 is displayed. Note that in the multi-display device M1, the liquid crystal display devices 11 to 19 are sequentially arranged from left to right and from top to bottom.

It is assumed that, by way of example of the limit power value of the liquid crystal display devices 11 to 19 used in the multi-display M1, the power value is limited to 25% of the maximum power that can be supplied to the backlight unit 6.

Also, it is assumed that the maximum power that can be supplied to the backlight unit 6 is 400 W. In this case, the limit power value of the backlight unit 6 is 25% of 400 W, that is, 100 W.

As illustrated in FIG. 4, an image Pr displayed on the multi-display device M1 is a figure in which two white vertical lines are formed on black background. Part of the white vertical lines is formed on each of the liquid crystal display devices 11 to 19 that constitute the multi-display device M1. Also, the image Pr illustrated in FIG. 4 is an image displayed in accordance with LED control data that is generated on the basis of image data (data obtained without the backlight light emission power being limited). Thus, brightness unevenness is unlikely to occur between images displayed by the liquid crystal display devices 11 to 19.

In the case where the image Pr is displayed on the multi-display device M1, backlight APL values of the liquid crystal display devices 11 to 19 are as illustrated in FIG. 5. Specifically, the backlight APL values of the liquid crystal display devices 11, 13, 17, and 19 arranged at four corners of the multi-display device M1 are 15%. The backlight APL values of the liquid crystal display devices 12, 14, 16, and 18 arranged at the center of corresponding sides of the multi-display device M1 are 30%. The backlight APL value of the liquid crystal display device 15 arranged at the center of the multi-display device M1 is 60%.

The backlight APL value is the average lighting ratio of the LEDs 62 and is the same as the ratio of the backlight light emission power value to the maximum allowable power value. Accordingly, the backlight light emission value when the backlight unit 6 is driven at the backlight APL value 15% in each of the liquid crystal display devices 11, 13, 17, and 19 is determined from the maximum allowable power value and the backlight APL value, and is 15% of 400 W, that is, 60 W. Similarly, in each of the liquid crystal display devices 12, 14, 16, and 18, the backlight light emission power value is 30% of 400 W, that is, 120 W. In the liquid crystal display device 15, the backlight light emission power value is 60% of 400 W, that is 240 W. Therefore, when LED driving signals are generated on the basis of the backlight APL values generated from the LED data that has been adjusted by the adjustment circuit 51 (without performing backlight light emission power control) and the liquid crystal display devices 11 to 19 are driven, the backlight light emission power values of the backlights 6 of the liquid crystal display devices 12, 14, 15, 16, and 18 exceed the allowable power value.

Accordingly, the above-described backlight light emission power control is performed in each of the liquid crystal display devices 11 to 19 so as to limit light emission power supplied to the backlight unit 6. Each control condition setting circuit 55 compares the backlight APL value of the backlight unit 6 of a corresponding one of the liquid crystal display device 11 to 19 with the limit value. If the backlight APL value exceeds the limit value, the LED data correction circuit 52 corrects LED data using a correction factor obtained by dividing the backlight APL value by the limit value, that is, corrects power to be supplied to the backlight unit 6.

The limit value is 25%, whereas the backlight APL values of the liquid crystal display devices 11, 13, 17, and 19 are 15%, which is less than the limit value. Accordingly, the correction factor is equal to 1, that is, the value of power to be supplied to the backlight unit 6 is 60 W. Also, in the liquid crystal display devices 12, 14, 16, and 18, the backlight APL values are greater than the limit value. Thus, the correction factor is equal to a value obtained by dividing the limit value by the backlight APL value, that is, 25/30. As a result of using this correction factor, power to be supplied to the backlight unit 6 after the correction is 100 W. In the liquid crystal display device 15, the backlight APL value is 60%, and thus the correction factor is equal to 25/60. Accordingly, power to be supplied to the backlight unit 6 after the correction is 100 W.

By controlling the backlight light emission power in the above manner, the light emission power of each backlight unit 6 of a corresponding one of the liquid crystal display devices 11 to 19 is suppressed to 100 W or less, and consequently the condition regarding the backlight light emission power is met. However, because brightness of the backlight unit 6 changes depending on the backlight light emission power, brightness of images displayed by the liquid crystal display devices 11 to 19 changes depending on the corresponding correction factors. Accordingly, if backlight light emission power control is performed using different correction factors, brightness unevenness is caused among images displayed on the liquid crystal display devices. That is, if backlight light emission power control is performed independently for each liquid crystal display device of the multi-display device M1, brightness unevenness or discontinuity of images are more likely to occur.

Figure 6:
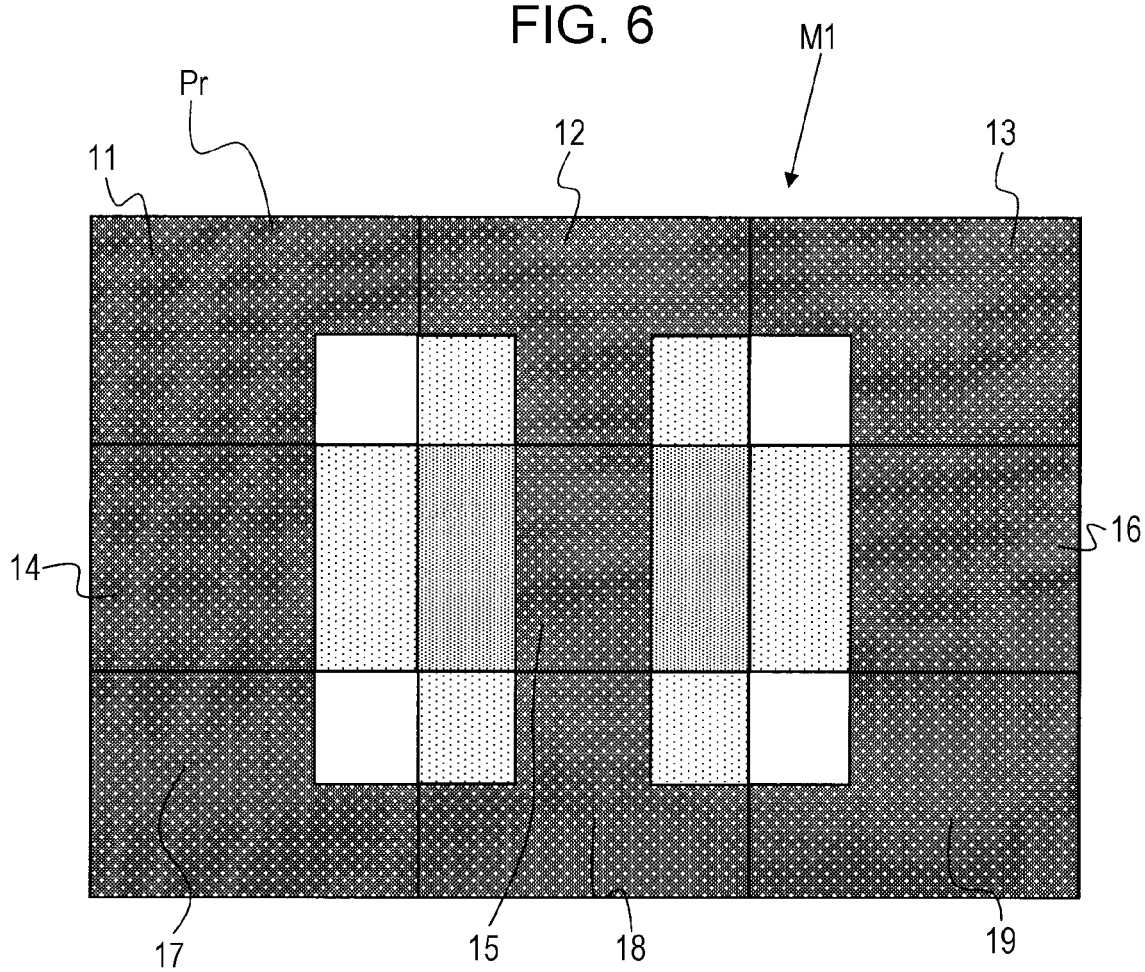
FIG. 6 is a diagram of a brightness uneven state that has occurred in the multi-display device.

This will be further described in detail with reference to the drawing. FIG. 6 is a diagram of at state in which brightness unevenness has occurred in the multi-display device. As described above, in the liquid crystal display devices 11, 13, 17, and 19, the correction factor is 1, and thus brightness of the backlight does not change before and after the correction. Suppose that brightness of images displayed on these liquid crystal display devices 11, 13, 17, and 19 is 1. In contrast, in the liquid crystal display devices 12, 14, 16, and 18, the correction factor is 25/30, and thus after the correction, brightness of the backlight is reduced to 25/30 of the level before the correction. That is, brightness of images displayed on the liquid crystal display devices 12, 14, 16, and 18 is 25/30. Further, brightness of an image displayed on the liquid crystal display device 15 is 25/60. If backlight light emission power control is performed independently for each of the liquid crystal display devices 11 to 19, images with brightness differences between the liquid crystal display devices 11 to 19 (images which are discontinuous at boundary portions of the liquid crystal display devices) are obtained as illustrated in FIG. 6.

Accordingly, the multi-display device according to the present invention performs backlight light emission power control so as not to cause brightness unevenness of images among all the liquid crystal display devices 11 to 19 by using the light emission APL value adjustment unit 102. Backlight light emission power control described below uses the fact that power supplied to the backlight unit 6 is determined depending on a ratio between the backlight APL value and the limit value. Specifically, a backlight APL value which is adjusted so as not to cause brightness unevenness among the liquid crystal display devices (for example, so that all the backlight APL values are equal) by using the light emission APL value adjustment unit 102 is used as a reference backlight APL value. The reference backlight APL value is sent to each LED controller 5 of a corresponding one of the liquid crystal display devices 11 to 19. In this way, the light emission power value of each backlight unit 6 of a corresponding one of the liquid crystal display devices 11 to 19 is adjusted.

Figure 7:
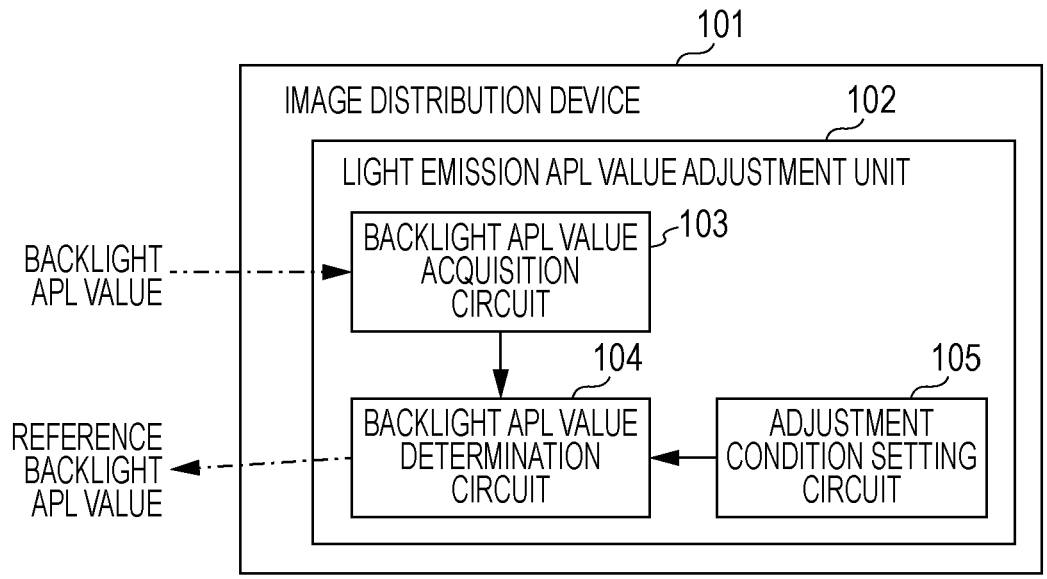
FIG. 7 is a diagram illustrating an example of the configuration of a light emission APL value adjustment unit.
Figure 8:
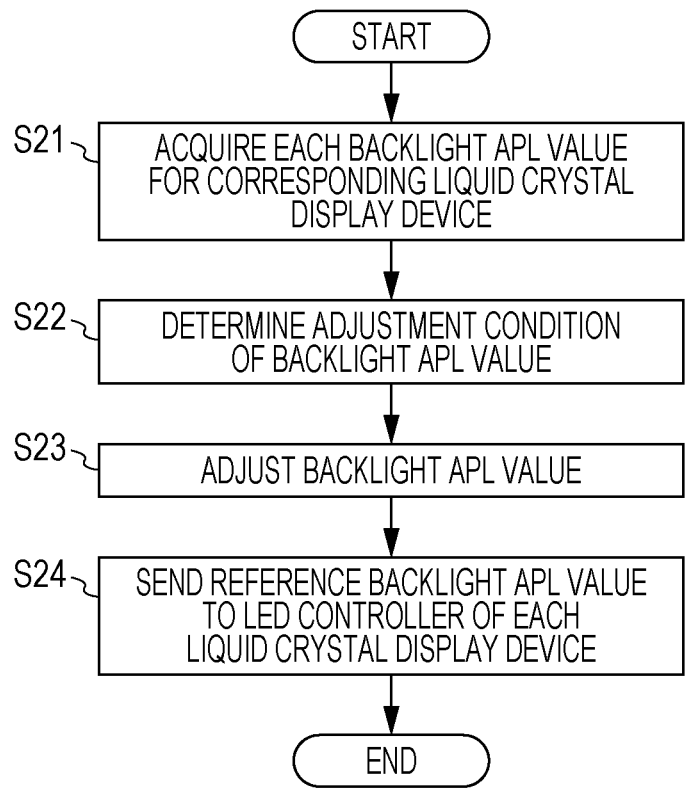
FIG. 8 is a flowchart of an operation of the light emission APL value adjustment unit illustrated in FIG. 7.

The light emission APL value adjustment unit 102 will be described in detail. FIG. 7 is a diagram illustrating an example of the configuration of the light emission APL value adjustment unit. FIG. 8 is a flowchart of an example of a backlight APL value adjustment process performed by the light emission APL value adjustment unit illustrated in FIG. 7. As illustrated in FIG. 7, the light emission APL value adjustment unit 102 includes a backlight APL value acquisition circuit 103, a reference backlight APL value determination circuit 104, and an adjustment condition setting circuit 105.

The backlight APL value acquisition circuit 103 is connected to the liquid crystal display devices 11 to 19, and acquires backlight APL values sent from the backlight APL value calculation circuits 55 of the corresponding liquid crystal display devices 11 to 19 (step S21). Based on information supplied from the liquid crystal display devices 11 to 19 and the multi-display device M1, the adjustment condition setting circuit 105 sets an adjustment condition for determining (adjusting) a backlight APL value, and sends the adjustment condition to the backlight APL value determination circuit 104 (step S22).

The reference backlight APL value determination circuit 104 acquires the backlight APL values of the liquid crystal display devices 11 to 19 from the backlight APL value acquisition circuit 103. Based on the adjustment condition acquired in step S22, the reference backlight APL value determination circuit 104 determines (adjusts) a backlight APL value (step S23). The reference backlight APL value determination circuit 104 sends, as a reference backlight APL value, the determined (adjusted) backlight APL value to the LED controllers 5 (control condition setting circuits 55) of the corresponding liquid crystal display devices 11 to 19 (step S24). The following describes specific examples of backlight light emission power control performed in the multi-display device by using the light emission APL value adjustment unit 102.

(First Embodiment)

Figure 9:
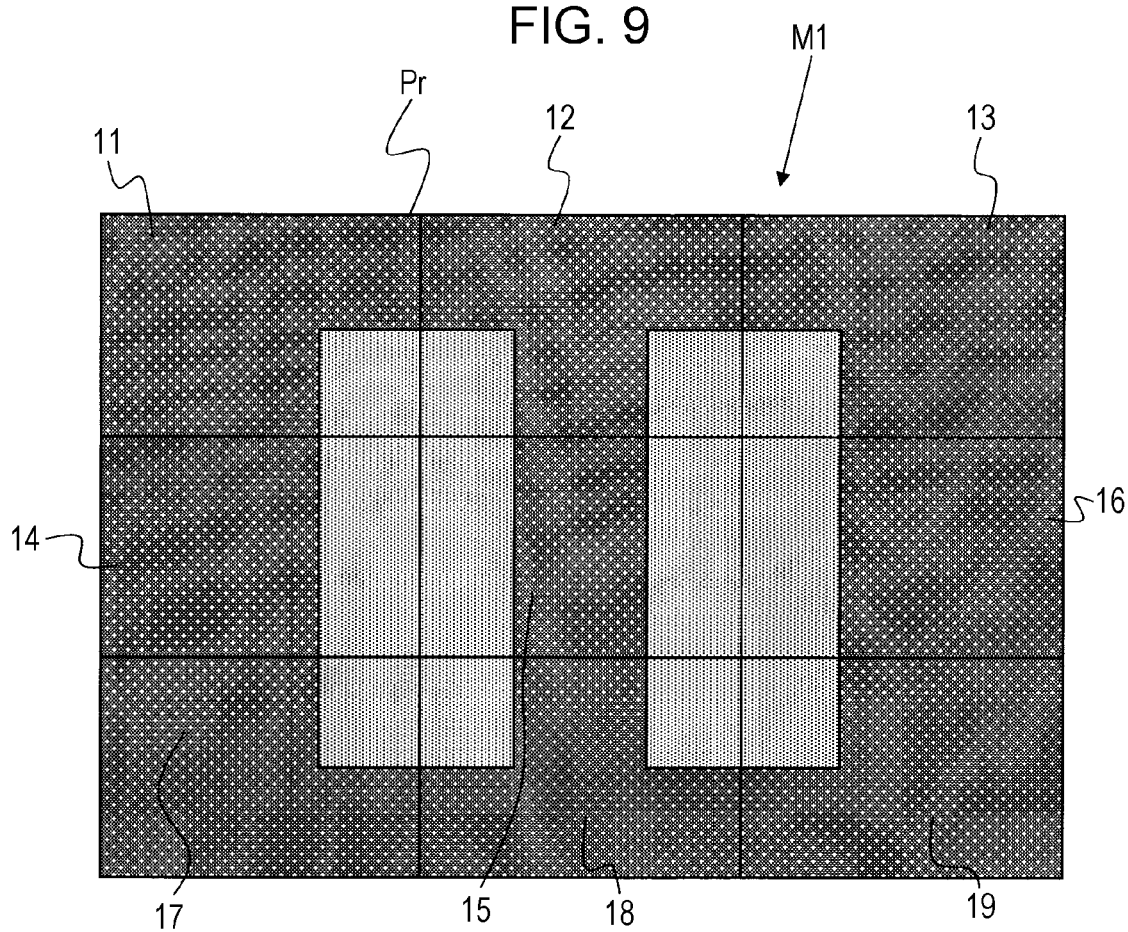
FIG. 9 is a diagram illustrating an image and backlight APL values obtained when an example of backlight light emission power control is performed in the multi-display device according to the present invention.

Backlight light emission power control performed in the multi-display device M1 will be described in detail. FIG. 9 is a diagram illustrating an image and backlight APL values obtained when backlight light emission power control is performed in the multi-display device according to the present invention. Similarly to the multi-display device M1 illustrated in FIGS. 4 to 6, the multi-display device M1 illustrated in FIG. 9 employs the liquid crystal display devices 11 to 19 for which limit values (25%, the limit power value 100 W) are set individually. Accordingly, the adjustment condition setting circuit 105 sends, to the reference backlight APL value determination circuit 104, information on a condition for determining the backlight APL value, i.e., "select the greatest value from among the backlight APL values acquired by the backlight APL value acquisition circuit 103", in order to make the condition for the correction factor be suitable for the liquid crystal display device having the most severe condition.

The reference backlight APL value determination circuit 104 that has received the information on the adjustment condition compares with each other the backlight APL values sent from the liquid crystal display devices 11 to 19, selects the greatest value, and determines the greatest value as the reference backlight APL value. Herein, as the backlight APL value, the determination value determination circuit 104 determines 60%, which is the backlight APL value acquired from the liquid crystal display device 15, as the reference backlight APL value, and sends the reference backlight APL value to the LED controller 5 (control condition setting circuit 55) of each of the liquid crystal display devices 11 to 19.

Because the reference backlight APL value is 60%, the LED data correction circuit 52 of each of the liquid crystal display devices 11 to 19 corrects a value of LED data using the correction factor of 25/60. Specifically, in each of the liquid crystal display devices 11 to 19, light emission power (current) supplied to the backlight unit 6 is corrected using the correction factor of 25/60. Values of light emission power to be supplied to the backlight units 6 of the corresponding liquid crystal display devices 11 to 19 are as follows.

A value of light emission power supplied to the backlight units 6 of the liquid crystal display devices 11, 13, 17, and 19 is equal to a value obtained by multiplying 15% of 400 W by the correction factor of 25/60, that is, 25 W. Similarly, a value of light emission power supplied to the backlight units 6 of the liquid crystal display devices 12, 14, 16, and 18 is equal to a value obtained by multiplying 30% of 400 W by the correction factor of 25/60, that is, 50 W. Further, in the liquid crystal display device 15, a value of light emission power supplied to the backlight unit 6 is equal to a value obtained by multiplying 60% of 400 W by 25/60, that is, 100 W.

As described above, in all the liquid crystal display devices 11 to 19, values of light emission power supplied to the backlight units 6 is equal to the limit power value (100 W) set for the individual backlight units 6 or less. Also, power needed for the entire multi-display device M1 when backlight light emission power control is performed for each of the liquid crystal display devices 11 to 19 is 740 W, whereas power needed when backlight light emission power control according to the present invention is performed is 400 W. Accordingly, the present invention also has an advantage of reducing power consumption.

Because the correction factor used when backlight light emission power control is performed in the individual liquid crystal display devices 11 to 19 are equal, brightness of images displayed on all the liquid crystal display devices 11 to 19 is even. Accordingly, occurrence of brightness unevenness in images between the liquid crystal display devices 11 to 19 can be suppressed in the multi-display device M1. Also, because the liquid crystal display devices 11 to 19 support area driving, the multi-display device M1 including the liquid crystal display devices 11 to 19 can suppress image inconsistency and power consumption and can display an image with peak brightness.

(Second Embodiment)

Figure 10:
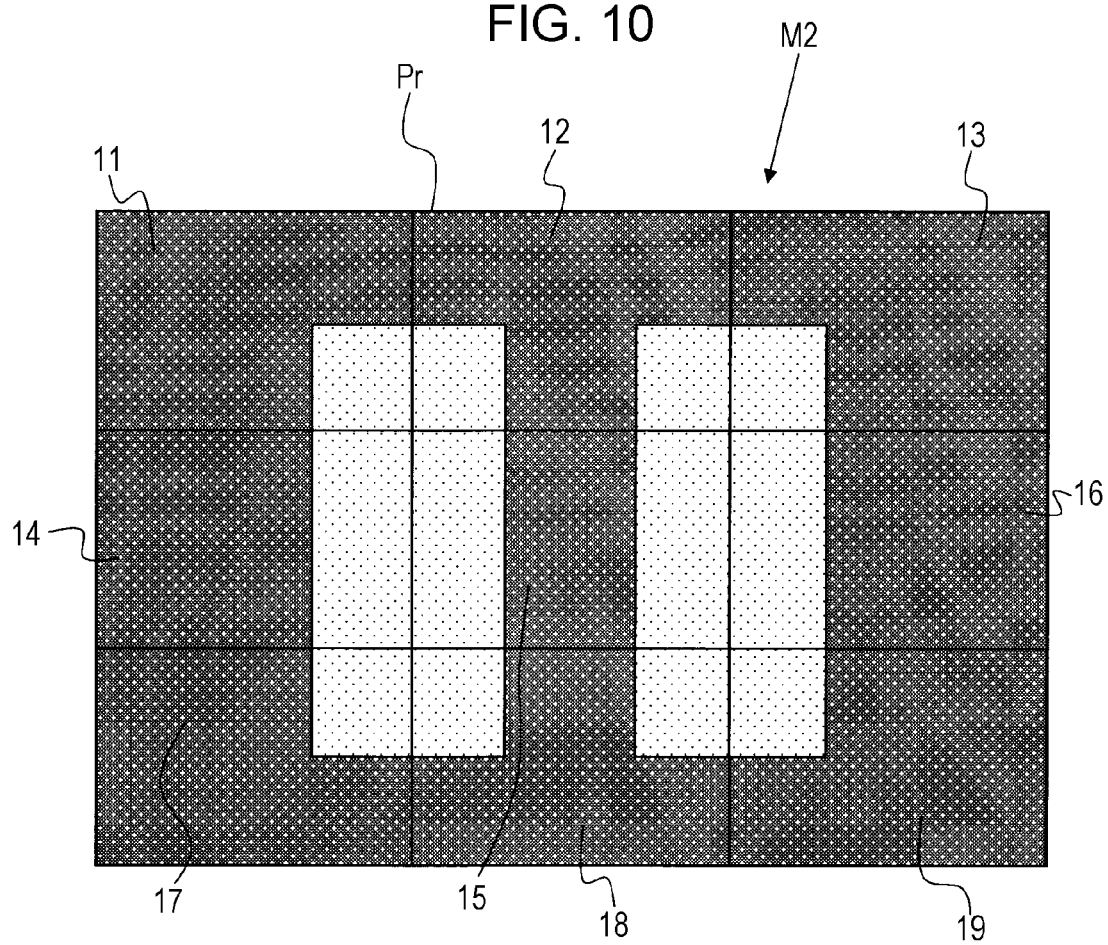
FIG. 10 is a diagram illustrating an image and backlight APL values obtained when another example of backlight light emission power control is performed in the multi-display device according to the present invention.

Next, another example of backlight light emission power control of the multi-display device according to the present invention will be described. FIG. 10 is a diagram illustrating another example of an image and backlight APL values obtained when backlight light emission power control is performed in the multi-display device according to the present invention. Note that image data of an image Pr displayed on a multi-display device M2 illustrated in FIG. 10 is the same as the image data of the image Pr displayed on the multi-display device M1 illustrated in FIG. 4. The multi-display device M2 is a display device in which power is limited so that the sum of limit power values of the liquid crystal display devices 11 to 19 is equal to 25% (900 W) of the maximum allowable power or less.

In this case, limitation may be imposed so that the sum of light emission power values of the backlight units 6 of the liquid crystal display devices 11 to 19 is equal to 25% (900 W) of the maximum value or less. The light emission power value depends on the backlight APL value. Accordingly, an average of backlight APL values calculated by the corresponding liquid crystal display devices 11 to 19 is used as the reference backlight APL value and is compared with the limit value. Accordingly, the adjustment condition setting circuit 105 sends, to the reference backlight APL value determination circuit 104, information on an adjustment condition "calculate an average of the backlight APL values acquired by the backlight APL value acquisition circuit 103".

The reference backlight APL value determination circuit 104 that has acquired the information on the adjustment condition calculates an average of the backlight APL values.

Specifically, the average of the backlight APL values is equal to (15%×4+30%×4+60%)/9, that is, about 26.7%. The reference backlight APL value determination circuit 104 sends, as the reference backlight APL value, this average to the LED controllers 5 (control condition setting circuits 55) of the corresponding liquid crystal display devices 11 to 19.

Because the reference backlight APL value is 26.7% in each of the liquid crystal display devices 11 to 19, the corresponding LED data correction circuit 52 corrects a value of LED data using the correction factor of 25/26.7. Specifically, in each of the liquid crystal display devices 11 to 19, light emission power supplied to the corresponding backlight unit 6 is corrected using the correction factor of 25/26.7. Values of light emission power supplied to the backlight units 6 of the corresponding liquid crystal display devices 11 to 19 are as follows.

A value of light emission power supplied to the backlight units 6 of the liquid crystal display devices 11, 13, 17, and 19 is equal to a value obtained by multiplying 15% of 400 W by the correction factor of 25/26.7, that is, about 56 W. Similarly, a value of light emission power supplied to the backlight units 6 of the liquid crystal display devices 12, 14, 16, and 18 is equal to a value obtained by multiplying 30% of 400 W by the correction factor of 25/26.7, that is, about 112 W. Further, in the liquid crystal display device 15, a value of light emission power supplied to the backlight unit 6 is equal to a value obtained by multiplying 60% of 400 W by 25/26.7, that is, about 225 W.

The sum of the values of light emission power supplied to the backlight units 6 of the liquid crystal display devices 11 to 19 is equal to 897 W, which is less than 900 W that is the sum of the limit power values. Accordingly, the multi-display device M2 can suppress the backlight light emission power to the limited power or less and can suppress occurrence of a failure due to generated heat or the like.

Because the correction factor used when backlight light emission power control is performed in the individual liquid crystal display devices 11 to 19 are equal, brightness of images displayed on all the liquid crystal display devices 11 to 19 is even. Accordingly, occurrence of brightness unevenness in images between the liquid crystal display devices 11 to 19 can be suppressed in the multi-display device M2.

Also, because all the liquid crystal display devices 11 to 19 support area driving, the multi-display device M2 including the liquid crystal display devices 11 to 19 can suppress image inconsistency and power consumption and can display an image with peak brightness. Moreover, because the backlight light emission power value is close to the limit power value, brightness of the backlight is high, and thus brightness of the entire image Pr can be increased.

(Third Embodiment)

Figure 11:
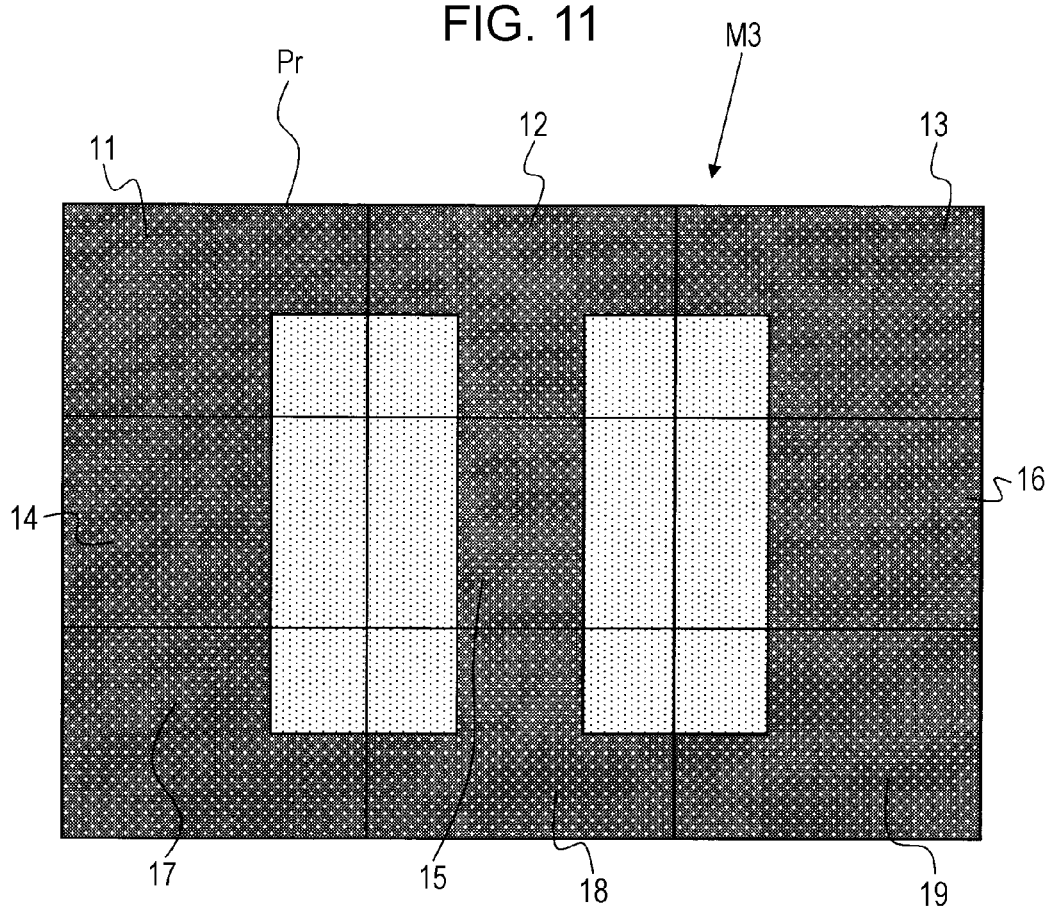
FIG. 11 is a diagram illustrating an image and backlight APL values obtained when still another example of backlight light emission power control is performed in the multi-display device according to the present invention.

Next, another example of backlight light emission power control of the multi-display device according to the present invention will be described. FIG. 11 is a diagram illustrating another example of an image and backlight APL values obtained when backlight light emission power control is performed in the multi-display device according to the present invention. Note that image data of an image Pr displayed on a multi-display device M3 illustrated in FIG. 11 is the same as the image data of the image Pr displayed on the multi-display device M1 illustrated in FIG. 4. In the multi-display device M3, three devices on the upper row (liquid crystal display devices 11 to 13), three devices on the middle row (liquid crystal display devices 14 to 16), and three devices on the lower row (liquid crystal display devices 17 to 19) are each treated as one group. The multi-display device M3 is a display device in which power is limited so that the sum of limit power values of the backlight units of each group of the liquid crystal display devices is equal to 25% (300 W for each group) of the maximum value or less.

In this case, limitation may be imposed so that the sum of light emission power values of the backlight units 6 of each of the upper row (liquid crystal display devices 11 to 13), the middle row (liquid crystal display devices 14 to 16), and the lower row (liquid crystal display devices 17 to 19) is equal to 25% (300 W) of the maximum value or less. The light emission power value depends on the backlight APL value. Thus, an average of backlight APL values is calculated for each of the upper row, the middle row, and the lower row, and the maximum value among the resulting averages is used as the adjusted backlight APL value. Accordingly, the adjustment condition setting circuit 105 sends, to the reference backlight APL value determination circuit 104, information on an adjustment condition "calculate averages of the backlight APL values for the upper row (liquid crystal display devices 11 to 13), the middle row (liquid crystal display devices 14 to 16), and the lower row (liquid crystal display devices 17 to 19) on the basis of the backlight APL values acquired by the backlight APL value acquisition circuit 103 and use the maximum value among the averages as the reference backlight APL value".

The reference backlight APL value determination circuit 104 that has obtained the information on the adjustment condition calculates averages of backlight APL values for the upper row, the middle row, and the lower row. The average of the backlight APL values for the upper row is equal to (15%× 2+30%)/3, that is, 20%. Similarly, the average of the backlight APL values for the middle row is equal to (30%×2+60)/3, that is, 40%. Further, the average of the backlight APL values for the lower row is equal to (15%×2+30%)/3, that is, 20%. The reference backlight APL value determination circuit 104 sends, to the LED controllers 5 (control condition setting circuits 55), the average value of the backlight APL values for the middle row, which is the maximum value and is 40%, as the reference backlight APL value.

Because the reference backlight APL value is 40% in each of the liquid crystal display devices 11 to 19, the corresponding LED data correction circuit 52 corrects a value of LED data using the correction factor of 25/40. That is, in each of the liquid crystal display devices 11 to 19, the light emission power value of the corresponding backlight unit 6 is corrected using the correction factor of 25/40. Values of light emission power supplied to the backlight units 6 of the liquid crystal display devices 11 to 19 are as follows.

A value of light emission power supplied to the backlight units 6 of the liquid crystal display devices 11, 13, 17, and 19 is equal to a value obtained by multiplying 15% of 400 W by the correction factor of 25/40, that is, about 38 W. Similarly, a value of light emission power supplied to the backlight units 6 of the liquid crystal display devices 12, 14, 16, and 18 is equal to a value obtained by multiplying 30% of 400 W by the correction factor of 25/40, that is, about 75 W. Further, in the liquid crystal display device 15, light emission power supplied to the backlight unit 6 is equal to a value obtained by multiplying 60% of 400 W by the correction factor of 25/40, that is, about 150 W.

The sum of the values of light emission power supplied to the backlight units 6 of the liquid crystal display devices 11 to 13 on the upper row is equal to 151 W, the sum of the values of light emission power supplied to the backlight units 6 of the liquid crystal display devices 14 to 16 on the middle row is equal to 300 W, and the sum of the values of light emission power supplied to the backlight units 6 of the liquid crystal display devices 17 to 19 on the lower row is 151 W. Accordingly, the sum of the values of light emission power supplied to each group, i.e., each of the upper, middle, and lower rows, is suppressed to the limit value of 300 W or less. Also, the sum of the light emission power values is less than power (740 W) consumed when backlight light emission power control is performed individually for the liquid crystal display devices 11 to 19. Accordingly, the multi-display device M3 can suppress the light emission power to the limit power value or less and can suppress occurrence of a failure due to generated heat or the like.

Because the correction factor used when backlight light emission power control is performed in the individual liquid crystal display devices 11 to 19 are equal, brightness of images displayed on all the liquid crystal display devices 11 to 19 is even. Accordingly, occurrence of brightness unevenness in images between the liquid crystal display devices 11 to 19 can be suppressed in the multi-display device M3. Also, because all the liquid crystal display devices 11 to 19 support area driving, the multi-display device M3 including the liquid crystal display devices 11 to 19 can suppress image inconsistency and power consumption and can display an image with peak brightness. Note that although the nine liquid crystal display devices are divided into groups of three devices on the upper row, the middle row, and the lower row in the present embodiment, the grouping method is not limited to this one.

(Other Embodiments)

The multi-display devices M1 to M3 in which the light emission APL value adjustment unit 102 is provided outside the liquid crystal display devices have been described by way of example. However, the light emission APL value adjustment unit 102 may be included in every liquid crystal display device. In this case, the backlight APL values calculated in the individual liquid crystal display devices are exchanged and the reference backlight APL value is calculated by each light emission APL value adjustment unit included in a corresponding liquid crystal display device. With this configuration, the case where the number of multi-display devices is increased is handled easily. Also, because no external device is needed, the configuration can be simplified.

Furthermore, one or multiple liquid crystal display devices, among those constituting the multi-display device, may include a light emission APL value adjustment unit having the same configuration as the light emission APL value adjustment unit. The rest of the liquid crystal display devices may send backlight APL values calculated by the corresponding backlight APL value calculation circuits to the liquid crystal display devices including the light emission APL value adjustment units. With this configuration, the number of liquid crystal display devices having a complicated configuration can be reduced, and thus production cost can be reduced. In the case where liquid crystal display devices that constitute the multi-display device are divided into multiple groups and a limit power value is determined for each group as in the third embodiment, at least one liquid crystal display in each group may include the light emission APL value adjustment unit.

Although the LED controller changes the reference current value and the PWM value in each of the above-described embodiments, the backlight APL value may be an average lighting ratio (an average of on periods) of the LED 62 in the case where PWM control is performed at a constant reference current value. That is, the backlight APL value is calculated by dividing the sum of lighting ratios of the LEDs 62 for individual areas by the number of areas. In this case, because the reference current value is constant, the current value changes depending on the PWM value. Accordingly, the backlight APL value is determined depending on the PWM value. In the case of this configuration, the backlight APL value calculation circuit may calculate PWM values for individual areas on the basis of values of LED data, and determine, as the backlight APL value, a ratio of the sum of PWM values to the sum of PWM values for individual areas when the backlight units are driven at the maximum output.

Furthermore, although the above-described multi-display devices each employ nine liquid crystal display devices, the number of liquid crystal display devices is not limited to nine. Also, although the nine liquid crystal display devices have the same configuration, liquid crystal display devices having different configurations may be sequentially arranged to form the multi-display device. In this case, instead of using the reference backlight APL value in common in all the liquid crystal display devices as described above, different reference backlight APL values may be used for individual liquid crystal display devices so that brightness of images displayed on the liquid crystal display devices is equalized.

Furthermore, for a multi-display device in which liquid crystal display devices of the same size and the same configuration are sequentially arranged, an APL value adjustment unit may send different reference backlight APL values to LED controllers of the liquid crystal display devices so as to make brightness of images even or obtain a desired brightness difference. For example, reference backlight APL values sent to the LED controllers of the liquid crystal display devices may be determined depending on the position of the viewer or the location where the multi-display device is installed.

Although image display devices that constitute a multi-display device are described in each of the above-described embodiments, each of the image display devices may be capable of independently displaying an image or may be an image display device that is used only as a constituent of the multi-display device. Also, image display devices capable of independently displaying images and image display devices used only as constituents of the multi-display device may coexist.

Also, although liquid crystal display devices are described as image display devices that constitute a multi-display device in each of the above-described embodiments, the image display devices are not limited to this example and a wide variety of image display devices that include image-display light-emitting means and that are capable of changing and calculating backlight APL values, which are average lighting ratios, for individual displays may be employed.

Further, although the case in which backlight light emission power control (correction) is required is described in each of the above-described embodiments, the control is not required in some cases. In such cases, the light emission APL value adjustment unit 102 may send, to the control condition setting circuit 54, a signal representing the limit value instead of the reference backlight APL value, or a signal representing that backlight light emission power control is not needed. Alternatively, sending of a signal from the light emission APL value adjustment unit 102 to the control condition setting circuit 54 may be stopped. If these conditions (reception of a signal representing the limit value, reception of the signal representing that control is not needed, and not receiving any signal for a certain period) are met, the control condition setting circuit 54 may supply the LED data correction circuit 52 with the correction factor of 1 (such as in step S15 of FIG. 3), or may send a signal representing that correction is not needed to the LED data correction circuit 52.

While the embodiments of the present invention have been described above, the present invention is not limited to this content. Also, the embodiments of the present invention may be variously altered as long as the alterations do not depart from the gist of the invention.

Industrial Applicability

The multi-display devices according to the present invention may be used as image display devices that are installed at a large place where many viewers gather, such as a station, an event site, or a stadium, and that send information (display an image) to many viewers at the same time.

REFERENCE SIGNS LIST

101 image division device
102 light emission APL value adjustment unit
11 to 19 liquid crystal display device
2 image data acquisition unit
3 area driving circuit
4 liquid crystal panel unit
41 liquid crystal panel
42 liquid crystal controller
43 liquid crystal driver
5 LED controller
51 adjustment circuit
52 LED data correction circuit
53 LED control signal generation circuit
54 control condition setting circuit
55 backlight APL value calculation circuit
6 backlight unit
61 LED driver
62 LED
63 LED mount board

The invention claimed is:

1. A multi-display device in which a plurality of image display devices are sequentially arranged and which is operable to display a continuous image, the multi-display device comprising:
   image-display light-emitting means including light-emitting elements that emit light for displaying the image;
   light emission brightness data determining means for determining, on the basis of image data displayed by the corresponding image display device, light emission brightness data for the image-display light-emitting means;
   light emission APL value calculating means for calculating, on the basis of the light emission brightness data, a light emission APL value which is an average lighting ratio of the light-emitting elements;
   light emission APL value adjusting means for adjusting, on the basis of the light emission APL values calculated by the light emission APL value calculating means each included in a corresponding one of the plurality of image display devices, a reference light emission APL value so that a total light emission power value of the image-display light-emitting means does not exceed a predetermined allowable power value and images are displayed on the plurality of image display devices at predetermined brightness; and
   light emission control means for controlling power to be supplied to the image-display light-emitting means, on the basis of the light emission APL value calculated by the light emission APL value calculating means or the reference light emission APL value adjusted by the light emission APL value adjusting means.

2. The multi-display device according to claim 1, wherein the light emission APL value adjusting means sends, as the reference light emission APL value, a light emission APL value that has been adjusted so as to equalize brightness of images displayed on all the image display devices, to the light emission control means.

3. The multi-display device according to claim 1, wherein the light emission APL value adjusting means is provided outside the plurality of image display devices, receives light emission APL values from the light emission APL value calculating means of the individual image display devices, and sends, as the reference light emission APL value, an adjusted light emission APL value to the light emission control means.

4. The multi-display device according to claim 1,
   wherein the light emission APL value adjusting means is included in at least one of the plurality of image display devices, and
   wherein the light emission APL value adjusting means receives light emission APL values calculated by the light emission APL calculating means included in the individual image display devices, and sends, as the reference light emission APL value, a light emission APL value that has been adjusted if needed to the light emission control means of the individual image display devices.

5. The multi-display device according to claim 1, wherein the light emission APL value adjusting means is included in all the plurality of image display devices, receives the light emission APL value calculated by the light emission APL value calculating means included in the same image display device, and the light emission APL value adjusting means sets the light emission APL value that has been adjusted if needed as the reference light emission APL value, and sends and receives the reference light emission APL values to and from the light emission APL value adjusting means included in the other image display devices.

6. The multi-display device according to claim 1, wherein the light emission APL value adjusting means adjusts the light emission APL value if needed, and sends, as the reference light emission APL value, the adjusted light emission APL value to the light emission control means.

7. The multi-display device according to claim 6,
   wherein the light emission APL value adjusting means stores, as a limit value, a ratio of power to be supplied to the image-display light-emitting means when white display is performed in each of the image display devices to maximum power that can be supplied, and
   wherein the light emission APL value adjusting means determines that the light emission APL value is to be adjusted in a case where at least one of the light emission APL values sent from the plurality of light emission APL value calculating means exceeds the limit value of the corresponding image-display light-emitting means, and sends, as the reference light emission APL value, the greatest light emission APL value among the plurality of light emission APL values to the light emission control means.

8. The multi-display device according to claim 7,
   wherein the light emission brightness data is data representing a value of current to be supplied to the light-emitting elements, and
   wherein the light emission control means includes light emission brightness data correcting means for multiplying the light emission brightness data by a correction factor which is a ratio of the limit value to the received reference light emission APL value.

9. The multi-display device according to claim 8,
   wherein light emission brightness of the light-emitting elements is controlled using PWM control, and wherein the light emission control means calculates a duty ratio of a PWM signal, on the basis of at least the light emission brightness data that has been corrected by the light emission brightness data correcting means.

10. The multi-display device according to claim 6,
wherein the light emission APL value adjusting means stores, as a limit value, a ratio of power to be supplied to all the image-display light-emitting means when white display is performed in all the image display devices to maximum power that can be supplied, and
wherein the light emission APL value adjusting means determines that the light emission APL value is to be adjusted in a case where the sum of the light emission APL values sent from the plurality of light emission APL value calculating means exceeds the sum of the limit values of the image-display light-emitting means, and sends, as the reference light emission APL value, an average of the plurality of light emission APL values to the light emission control means.

11. The multi-display device according to claim 6,
wherein the light emission APL value adjusting means manages the plurality of image display devices as a plurality of groups, and stores, as a limit value, a ratio of power to be supplied to the image-display light-emitting means when white display is performed in each of the image display devices to maximum power that can be supplied, and
wherein the light emission APL value adjusting means determines that the light emission APL value is to be adjusted in a case where the sum of the light emission APL values for each group sent from the light emission APL value calculating means of the image display devices that constitute the group exceeds the sum of the limit values for the image display devices of the group, calculates averages of the light emission APL values for the individual groups, and sends, as the reference light emission APL value, the greatest value among results of the calculation to the light emission control means.

12. The multi-display device according to claim 1, wherein the image display devices are liquid crystal display devices and the image-display light-emitting means is a backlight.

13. An image display device used in the multi-display device according to claim 1, the image display device is operable to display an image independently.

* * * * *